US009313557B1

(12) United States Patent
Chen et al.

(10) Patent No.: US 9,313,557 B1
(45) Date of Patent: Apr. 12, 2016

(54) RACK WITH MOUNTING COLUMN

(75) Inventors: Angela Ying-Ju Chen, San Francisco, CA (US); William Dailey, Redwood City, CA (US)

(73) Assignee: Google Inc., Mountain View, CA (US)

( * ) Notice: Subject to any disclaimer, the term of this patent is extended or adjusted under 35 U.S.C. 154(b) by 755 days.

(21) Appl. No.: 13/558,730

(22) Filed: Jul. 26, 2012

(51) Int. Cl.
*A47F 7/00* (2006.01)
*H04Q 1/06* (2006.01)
*G02B 6/44* (2006.01)

(52) U.S. Cl.
CPC .............. *H04Q 1/06* (2013.01); *G02B 6/4452* (2013.01)

(58) Field of Classification Search
CPC ......... H04Q 1/06; H04Q 1/062; H04Q 1/066; H04Q 1/068; G02B 6/4452; G02B 6/4459
USPC ........................................................ 211/26
See application file for complete search history.

(56) References Cited

U.S. PATENT DOCUMENTS

| 5,093,887 | A | * | 3/1992 | Witte | 385/135 |
| 5,969,294 | A | * | 10/1999 | Eberle et al. | 174/57 |
| 6,135,583 | A | * | 10/2000 | Simon et al. | 312/257.1 |
| D440,210 | S | * | 4/2001 | Larsen et al. | D13/199 |
| 6,347,714 | B1 | * | 2/2002 | Fournier et al. | 211/26 |
| 2006/0091086 | A1 | * | 5/2006 | Canty et al. | 211/26 |
| 2011/0211329 | A1 | * | 9/2011 | Dean et al. | 361/826 |

* cited by examiner

*Primary Examiner* — Korie H Chan
(74) *Attorney, Agent, or Firm* — Lerner, David, Littenberg, Krumholz & Mentlik, LLP

(57) ABSTRACT

Aspects of the disclosure relate generally to rack systems for housing computing devices. The rack may include a plurality of removable shelves. A removable shelf may include a column having a plurality of slots. By stacking a plurality of the removable shelves in the rack, a larger column may be formed. This larger column may provide additional space to mount other features. In one example, the larger column may be used to mount a wire duct. The wire duct may be attached to a mounting plate having a plurality of hooks. The hooks of the mounting plate may mate with the slots of the columns of the shelves. The mounting plates may be used to mount features at other locations on the rack as well.

11 Claims, 17 Drawing Sheets

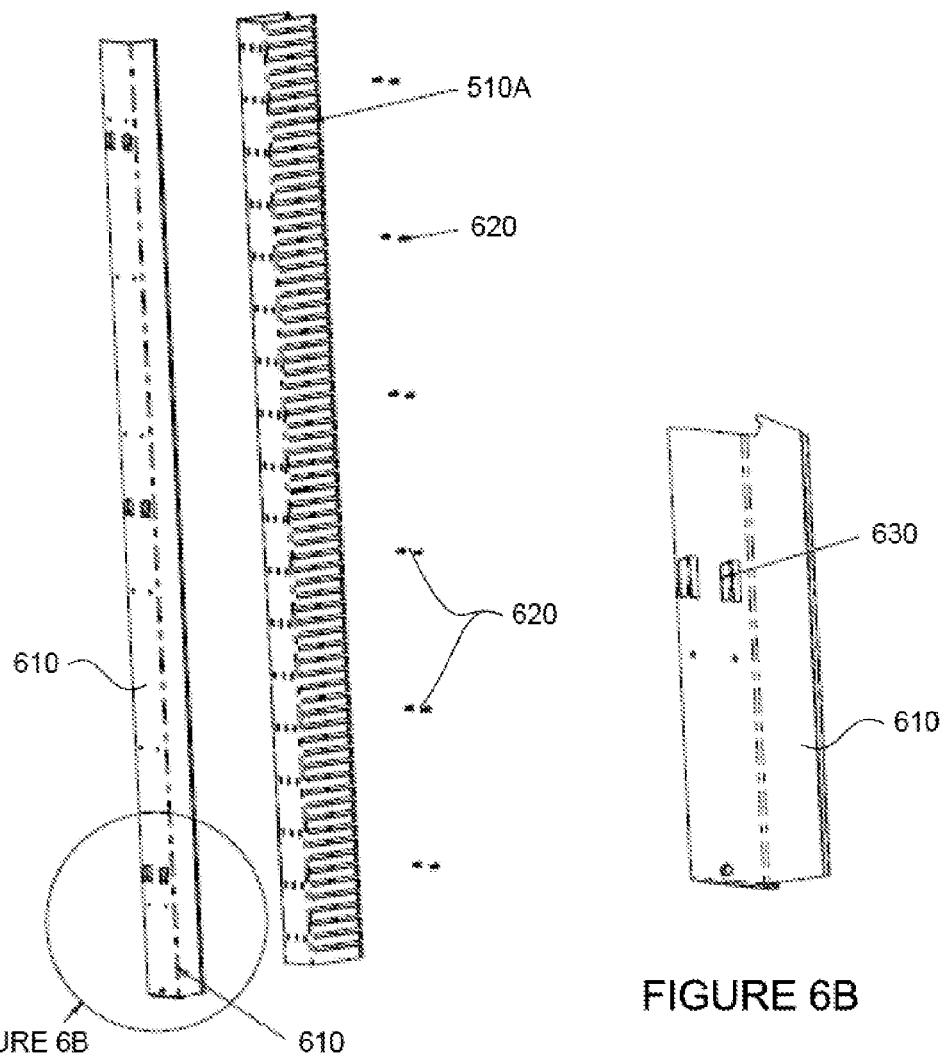

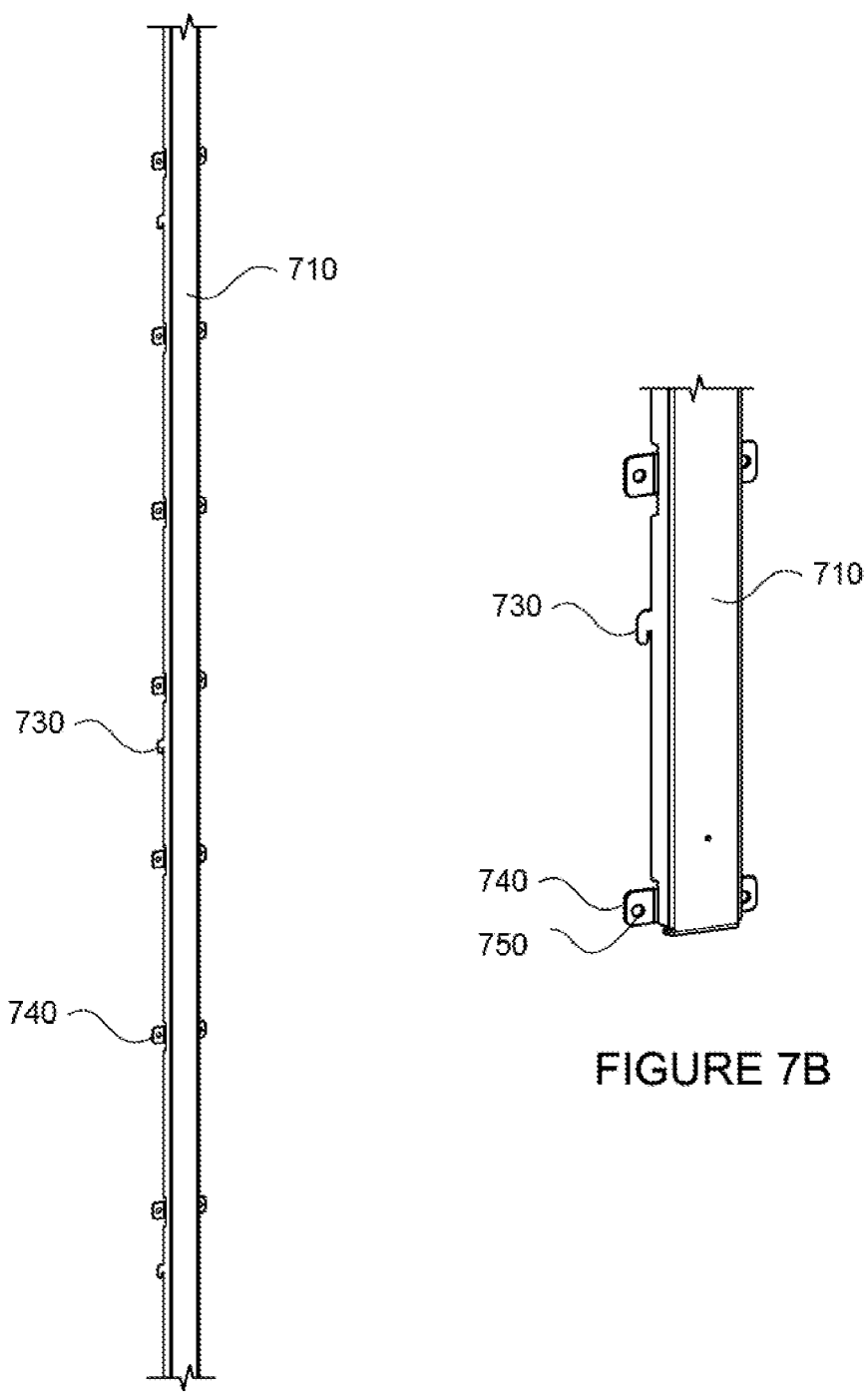

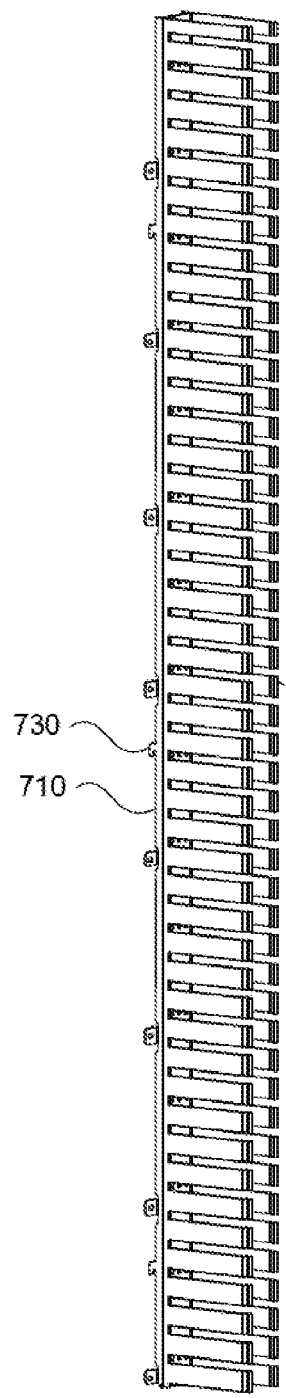 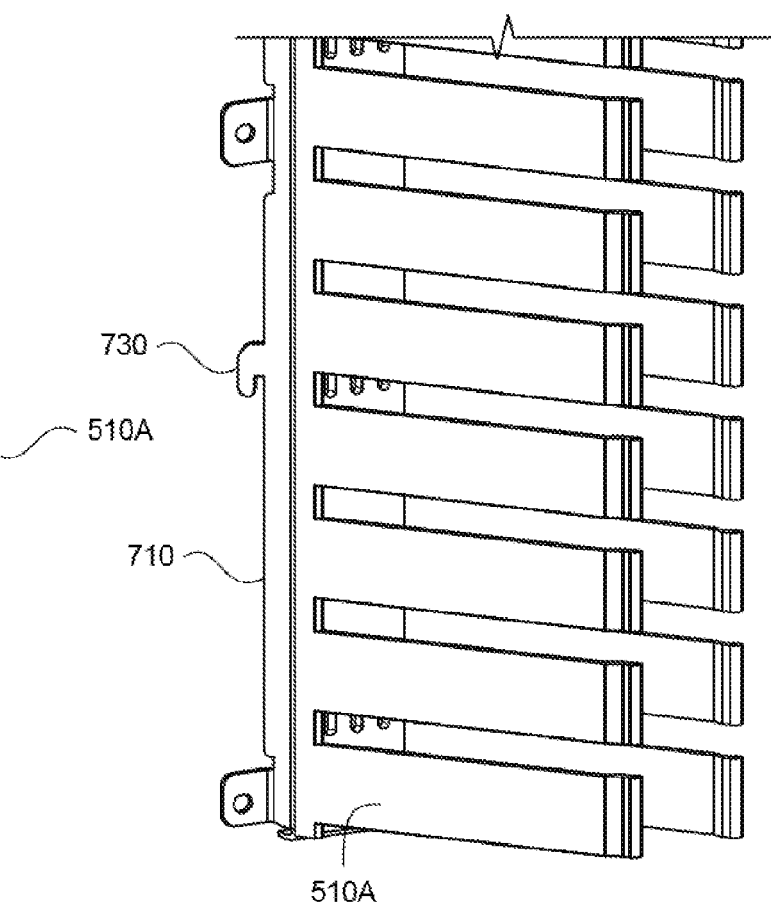
FIGURE 8B
FIGURE 8A

RACK WITH MOUNTING COLUMN

BACKGROUND

Corporations operating large-scale computing systems invest significant amounts of capital to establish and maintain the hardware necessary to house the computing systems. For example, some computing systems may include a plurality of racks for holding computing devices such as hard drives or entire servers. Often, it may be difficult to make changes to update the arrangement of wiring, computing, and other features in the racks as they are made and sold with fixed configurations.

SUMMARY

One aspect of the disclosure provides a rack assembly for housing one or more computing components. The rack assembly includes a rack having a first side wall with a interior facing wall and a second side wall with an interior facing wall oppositing of the interior facing wall of the first side wall. The interior facing walls of the first and second side walls are configured to receive a plurality of shelves. The rack assembly also includes a set of removable shelves configured to rest between the interior facing wall of the first surface and the interior facing wall of the second surface. The set of removable shelves includes a first shelf at a first position in the rack between the interior facing wall of the first surface and the interior facing wall of the second surface. The first shelf has a first column with at least two sides. The set of removable shelves also includes a second shelf at a second position in the rack between the interior facing wall of the first surface and the interior facing wall of the second surface and directly above the first position. The second shelf having a second column with at least two sides. The at least two sides of the first column and the at least two sides of the second column form a larger column within the rack. The larger column is configured for mounting a device along a surface of the larger column.

In one example, the first column and the second column are separated by a gap and the larger column spans the heights of the first column, the second column, and the gap. In another example, the larger column includes a hollow space that spans from a top opening of the second column to a bottom opening of the first column. In yet another example, the device is a wire duct for cable management. In a further example, the larger column includes a plurality of slots for mounting a mounted feature. In another example, the first shelf comprises a first bay and a second bay for receiving computing components, and the first column separates the first bay from the second bay. In yet another example, the first bay is configured to house a computing component. In a further example, the surface of the larger column comprises a first side of the at least two sides of the first column and a second side of the at least two sides of the second column and the larger column is configured for mounting the device along both the first side and the second side.

In another example, the larger column includes a plurality of slots disposed on a front surface of the first column and a front surface of the second column and the rack assembly also includes a mounting plate having a plurality of hooks configured to mate with the plurality of slots in order to mount the mounting plate to the larger column. In this example, the mounting plate is attached to a wire duct by a plurality of rivets. In addition, the wire duct is secured to the larger column with a plurality of spring plungers. Alternatively or in addition, the mounting plate includes a set of tabs configured to align with a front surface of the first shelf adjacent to the first column in order to secure the mounting plate to the first shelf.

Another aspect of the disclosure provides a rack assembly for housing one or more computing components. The rack assembly includes a first side and a second side wall. The first side wall has a shelf mounting surface that faces a shelf mounting surface of the second side wall, and at least one of the first and second side walls includes a plurality of slots. The rack assembly also includes a set of removable shelves configured to rest between the shelf mounting surface of the first side wall and the shelf mounting surface of the second surface. The set of removable shelves are configured to support the one or more computing components. The rack assembly also includes a mounting plate having a plurality of hooks configured to mate with the plurality of slots in order to mount the mounting plate to the at least one of the first and second side walls.

In one example, the mounting plate is attached to a wire duct by a plurality of rivets. In another example, the wire duct is secured to the front surface with a spring plunger. In a further example, the mounting plate includes a set of tabs configured to align with a front surface of a first shelf of the set of shelves in order to secure the mounting plate to the first shelf and further support the one or more computing devices.

BRIEF DESCRIPTION OF THE DRAWINGS

FIGS. 6A and 6B are example diagrams of a mounting plate and wire duct in accordance with aspects of the disclosure.

FIGS. 7A and 7B are example diagrams of a mounting plate and wire duct in accordance with aspects of the disclosure.

FIGS. 8A and 8B are example diagrams of a mounting plate and wire duct in accordance with aspects of the disclosure.

DETAILED DESCRIPTION

Figure 1:
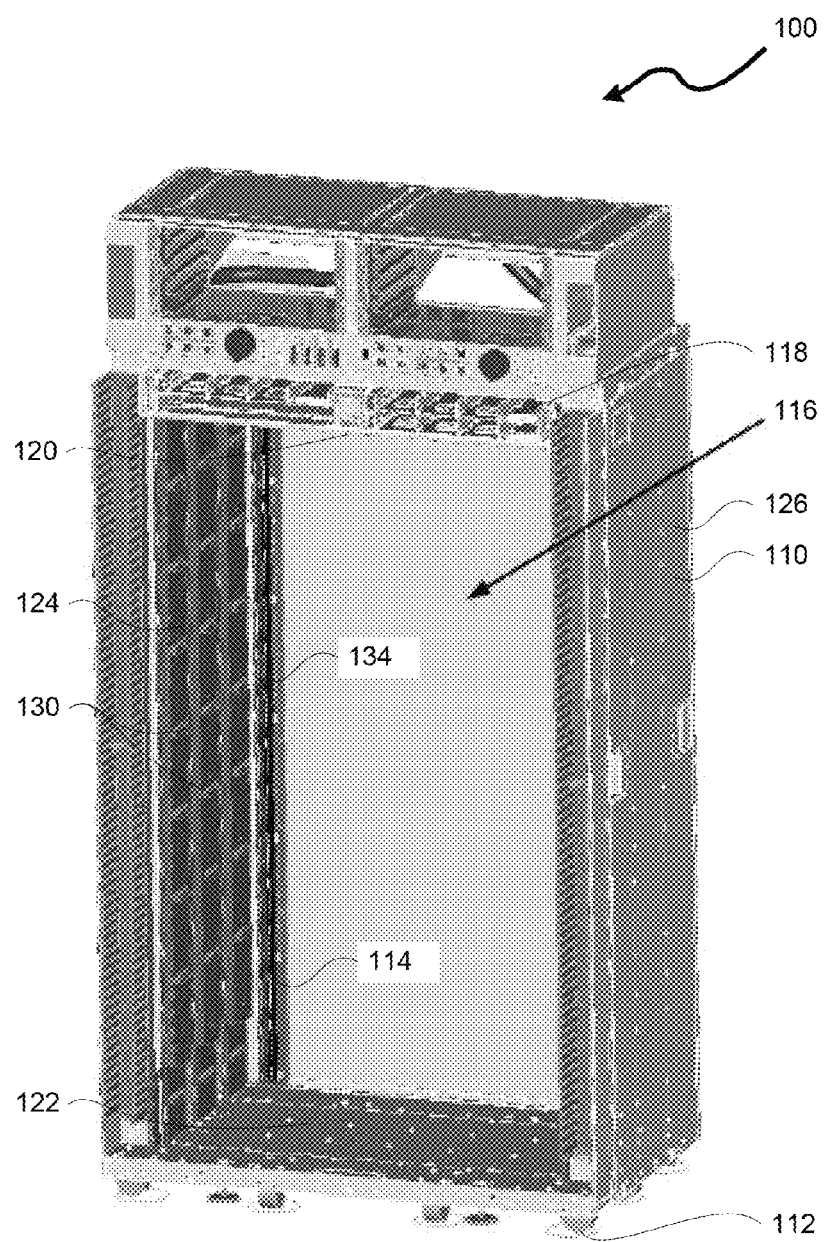
FIG. 1 is an example diagram of a rack architecture in accordance with aspects of the disclosure.

FIG. 1 is an example of aspects of a mobile rack system 100 including a mobile rack 110 having wheels 112, and an opening 116 for receiving removable shelves. The rack may include one or more storage locations 118 for housing various devices such as a rack monitoring unit (RMU) (not shown) for monitoring the status of the features of the rack and rectifiers (not shown). Rack 110 may also include a main bus bar 114 for supply power to various computing components (discussed in more detail below).

The rack 110 may include a top end 120, a bottom end 122, opposing inner sidewalls 124 (only one shown), and outer sidewalls 126 (only one shown). FIG. 1 depicts a view of the front end 134 of the rack, for example, an end from which shelves and computing devices may be inserted and removed. Opposite of the front end is a back end of the rack. The inner sidewalls may be configured with components for receiving and supporting removable shelves. For example, inner side walls 124 may include a plurality of flanges 130 arranged in rows to support removable shelves.

Figure 2:
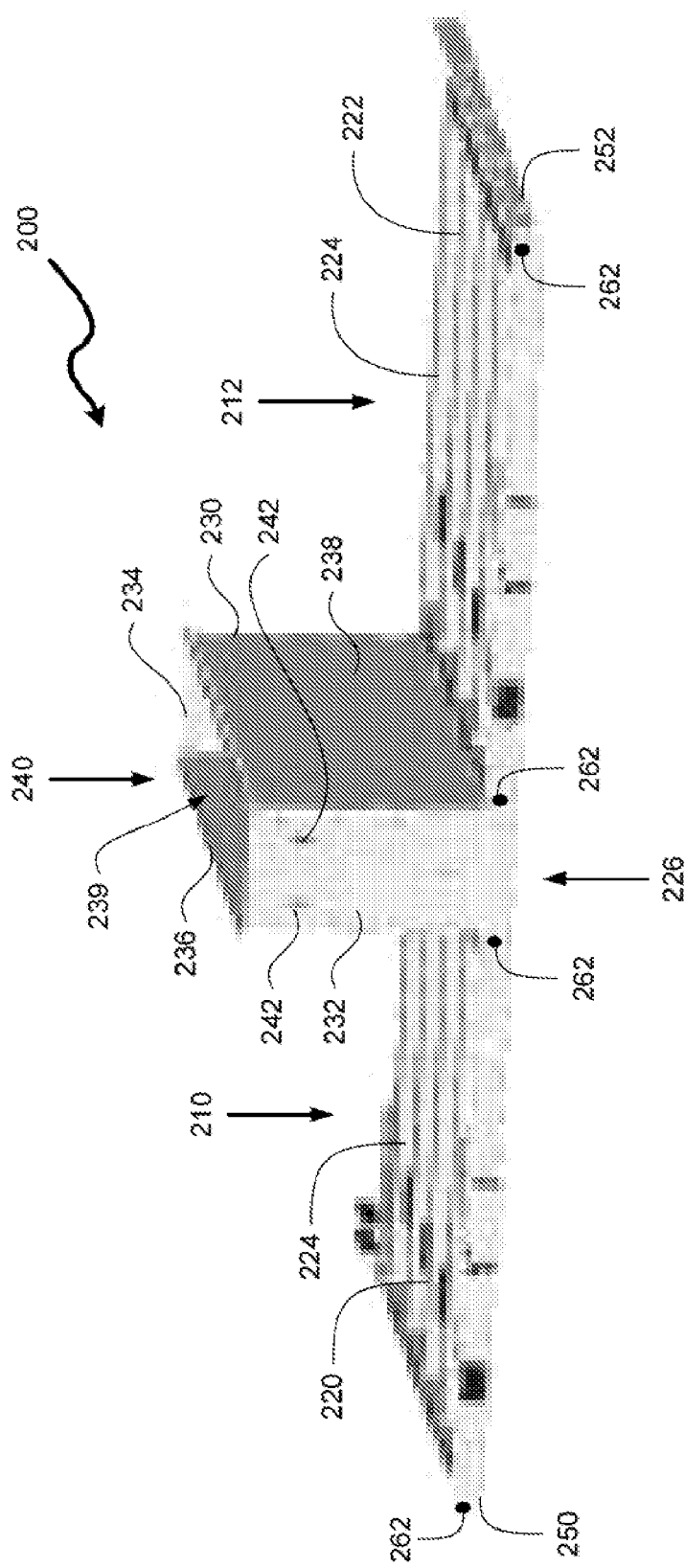
FIG. 2 is an example diagram of a removable shelf in accordance with aspects of the disclosure.

FIG. 2 is an example of a removable shelf 200. Removable shelf 200 includes a top surface 224 having two bays 210, 212 each arranged to hold at least one computing component in support surfaces 220 and 222 of top surface 224. The shelf also includes a bottom surface 226. The removable shelves may have various configurations. For example, different shelves may have a different number of bays or may be configured to support a single computing component or a plurality of computing components.

In the example of FIG. 2, shelve 200 also includes a column 230. The column may include front wall 232, rear wall 234, and sidewalls 236, 238. In this example, the walls 232-238 may separate bay 210 and 212. The walls may form a hollow open space 239, as shown in FIG. 2, with an opening at the top end 240 and the bottom end (not shown). While the examples used herein depict and describe a hollow column, the column may also include features inside the hollow space in order to lend additional support to the rack. As described in more detail below, the front side 232 may also include a plurality of slots 242. As noted above, the removable shelves 200 may be placed into the rack 119. Shelf 200 may also include edges 250, 252 that rest above and are supported by the flanges 130 (see FIG. 1) of the rack 110.

Figure 3:
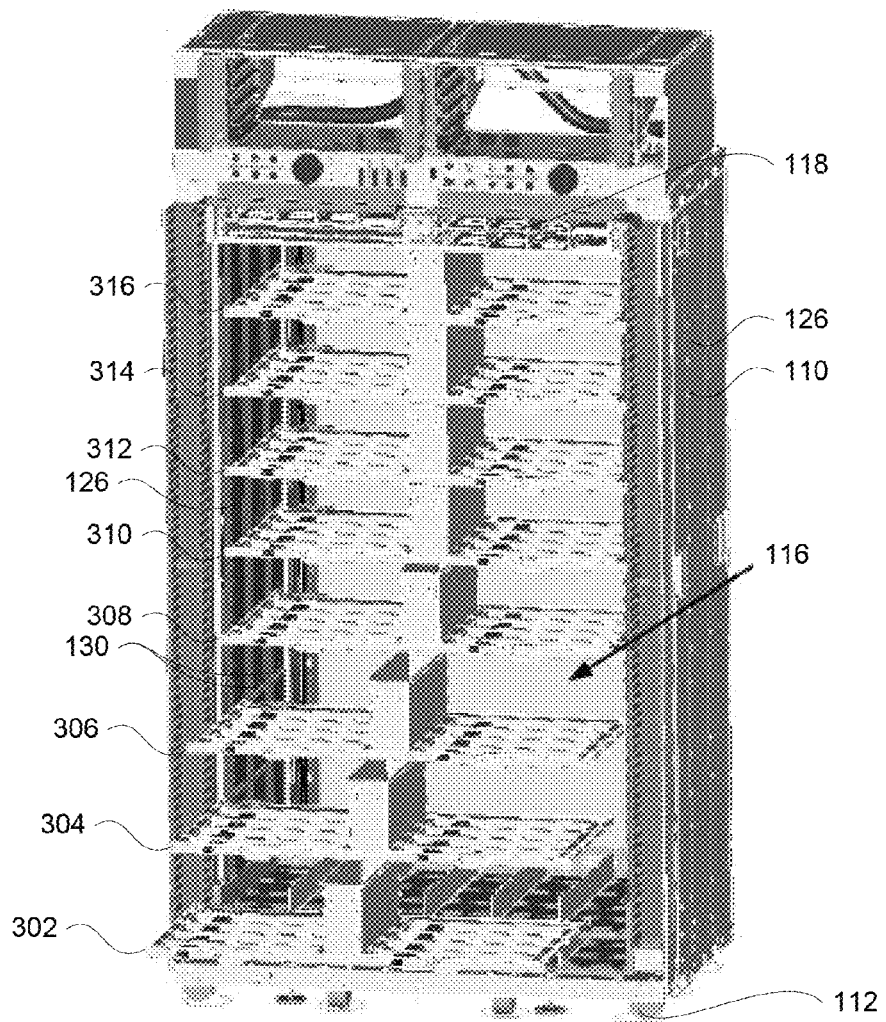
FIG. 3 is another example diagram of a rack architecture in accordance with aspects of the disclosure.

As shown in FIG. 3, a plurality of shelves 302, 304, 306, 308, 310, 312, 314, 316, may be placed into the rack 110. These shelves have the same configuration as shelf 200 of FIG. 2. Each shelf may be positioned above a row of flanges and slid into the rack. For example, shelf 306 is positioned above flanges 130 and slid into the rack 110. Shelves 302, 304, 306, 308, 310, show a progression of the shelves as they are placed and slid into the rack 110.

Figure 4:
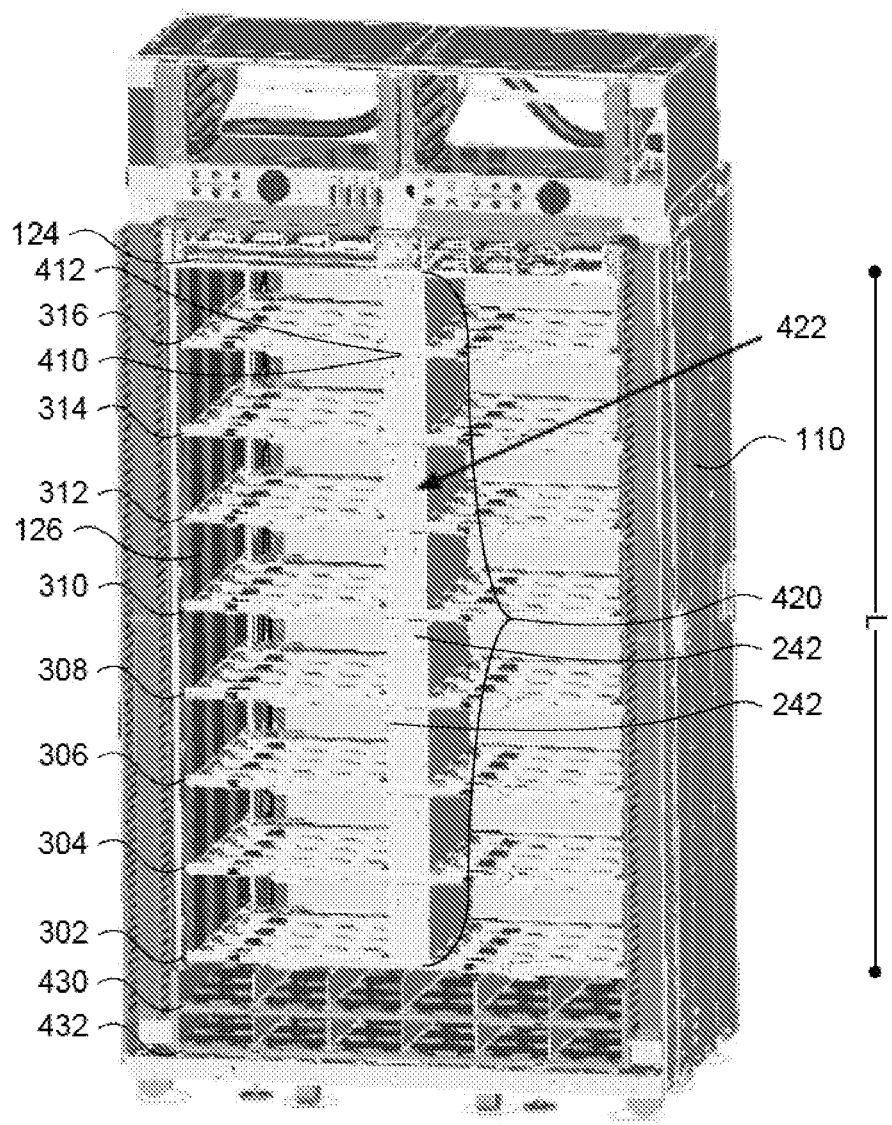
FIG. 4 is a further example diagram of a rack architecture in accordance with aspects of the disclosure.

When placed in the rack, the height of the sidewalls of a column of a particular shelf may span (or almost span) the distance between the particular shelf and another shelf directly above the particular shelf. For example, as shown in FIG. 4, the top end of the column of shelf 314 may reach just below the bottom surface of shelf 316 (see FIG. 2). The distance between top end 410 and bottom surface 412 may be just large enough to be able to remove shelves 314 and 316 from the rack 110. For example, the shelf spacing may be designed for a 0.020 inch gap for a tighter fit or a 0.100 inch gap for a looser fit. Larger gaps may also be used, however, they may be a less efficient use of space within the rack.

When the removable shelves are placed in the rack, the columns of these shelves may line up to create a larger column. For example FIG. 4 depicts a center column 420 formed from the columns of shelves 302, 304, 306, 308, 310, 312, 314, and 316. Center column 420 may thus include a length L spanning from the top of the rack 120 towards the bottom of the rack 122 (see FIG. 1). While the examples herein describe and depict a center column, it will be understood that the larger column may be located anywhere between the inner side walls of the rack, depending on the configuration of the shelves, and not necessarily in the center. Moreover, a plurality of columns may be present.

As noted above, the columns of these shelves may be hollow, thus center column 420 may include a hollow opening within the middle of the center column from the top opening of the column of shelf 316 to the bottom of shelf 302. The hollow opening may reduce the total weight of the rack by using folded sheet metal rather than solid blocks. As noted above, the hollow opening of each shelf may include additional features in order provide additional support to the rack. For example, if the center column includes only 2 sidewalls and a rear wall with no front wall, the empty channel within the column may be used for additional cable routing or wiring.

The rack 110 may also receive other removable shelves that do not include columns. For example, shelves 430 and 432 of FIG. 4 may be configured to hold uninterruptable power supply units for a battery backup feature of the rack. These other removable shelves may be placed in the rack either above or below the shelves with columns in order to preserve the stacked arrangement of the shelves forming the center column.

As the center column 420 is formed from a plurality of removable shelves, the center column may also include a front surface a plurality of slots. For example, center column 420 may include a front surface 422 formed from the front walls 232 of the columns of the shelves 302, 304, 306, 308, 310, 312, 314, and 316. As the front walls 232 also included slots 242, the center column may also include a plurality of slots 242 arranged along length L of center column 420.

Figure 5A:
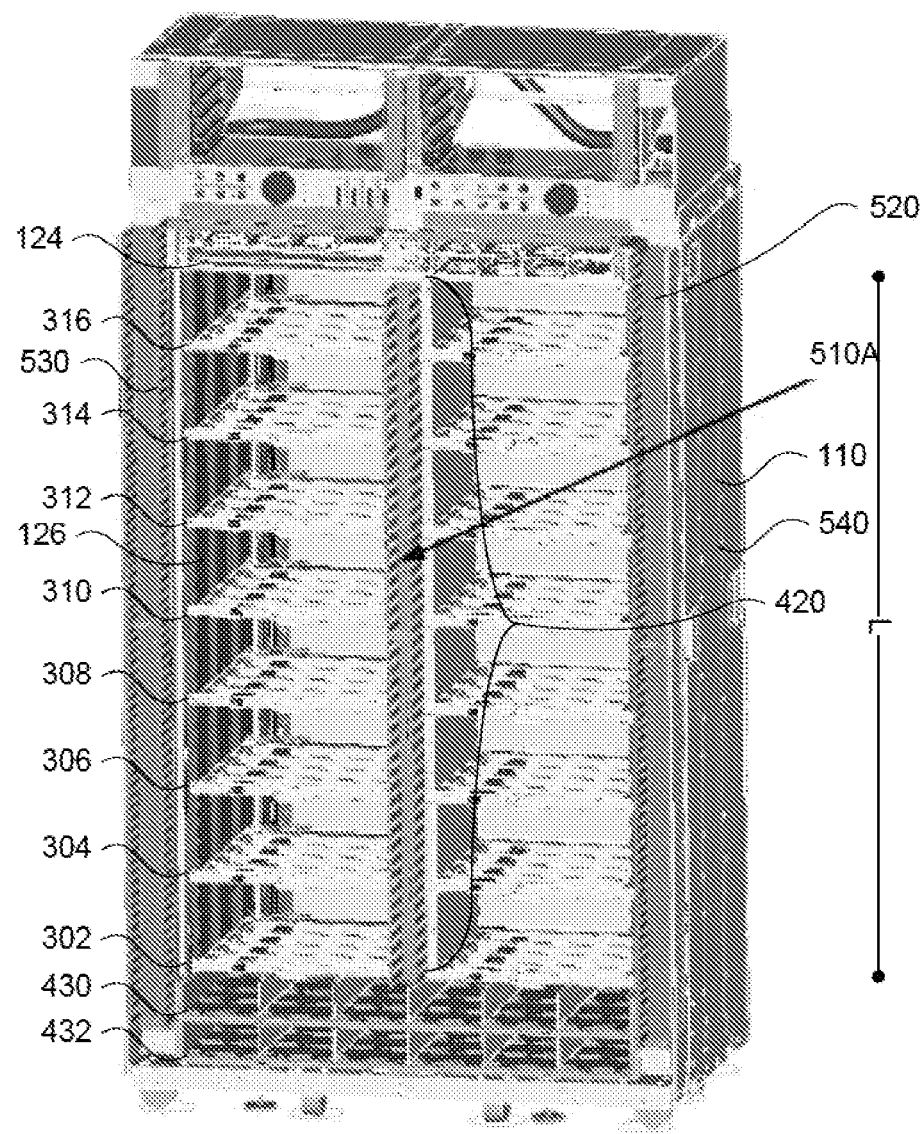
FIGS. 5A, 5B, 5C, and 5D are example diagrams of rack architecture in accordance with aspects of the disclosure.
Figure 5B:
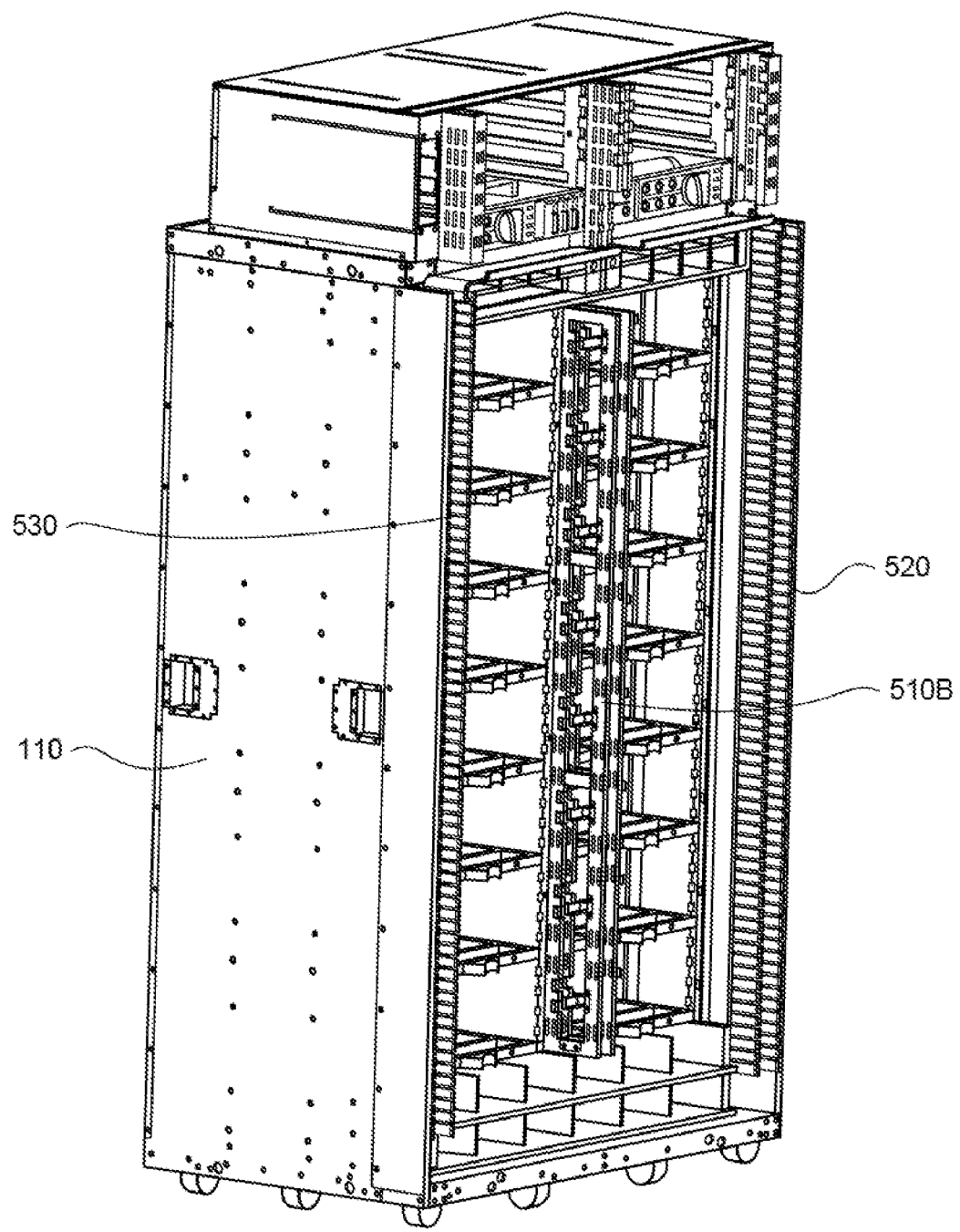

The slots may be used to mount various devices. These devices may include various wire management structures. For example as depicted in FIGS. 5A and 5B, wire ducts 510A and 510B may be secured to the center column at the front end of the rack. By mounting the wire ducts 510A and 510B in the front of the rack, wires may be easily accessed without having to maneuver the rack into another position or removing components in order to be able to access the wiring. The wires may include for example CAT5 copper cabling, power harnesses, fiber optical fiber/fiber bundles, etc. The wire duct may provide for efficient management and organization of cables at the front end of the rack. A similar configuration of the center column may also be used in order to mount a wire duct at the back end of the rack as well. In one example, the wire duct may be configured for wires for transmitting data. The wire duct 510 may be an off the shelf component or may be specially configured for the rack.

The wire duct may be used to run wires towards or away from the computing components of the rack. For example, a cable may have both a source and a destination end. The wire duct may be placed adjacent to the source and destination components that are to be connected. As with typical wire duct configurations, the source end of the cable may exit a slot in the wire duct that is adjacent to the source component. The destination end of the cable may exit a slot in the wire duct that is adjacent to the destination component. A certain length may be allowed at each end to ensure the cable reaches from the wire duct to its destination ports. The remaining length of the cable may be managed and stored in the wire duct. If a cable is longer than the distance between the source and the destination, the additional slack in the cable manager may be managed by creating loops of the excess length of cable in the wire duct.

Figure 5C:
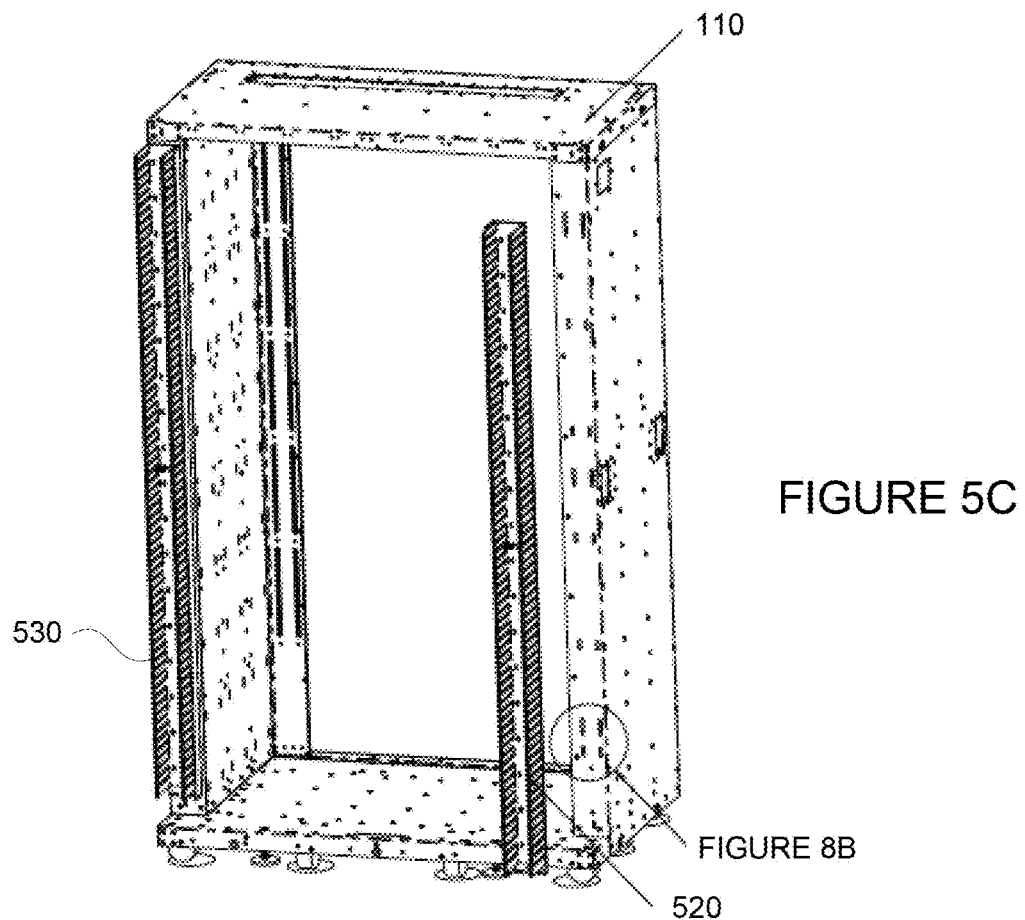
Figure 5D:
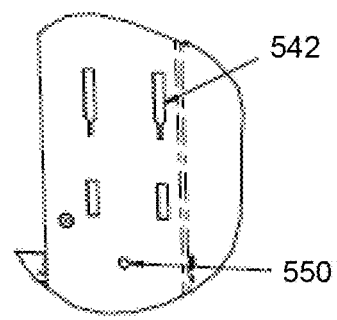

Rather than using the front of the column to mount a wire duct, wire ducts may also be mounted at other convenient locations on the rack. For example, FIGS. 5A and 5B depict wire ducts 520 and 530 mounted on the sidewalls of the rack. As shown in FIGS. 5C and 5D rack 110 may include additional set of slots 542 (configured similarly to slots 242) for mounting the wire ducts 520 and 530. In the examples of FIGS. 5A-5BC, the wire ducts are mounted on the front end of the rack, but wire ducts may also be mounted on the outer surfaces, such as surface 540, of the sidewalls or on the back end of the rack.

In another example, if the center column includes only 2 sidewalls and a rear wall with no front wall, rather than mounting a wire duct, a cable cartridge may be used within the empty channel. The cable cartridge may be removed and replaced in order to access, organize, and manage cables for the rack.

In some examples, the various wire management structures may be mounted to the rack using a mounting plate. For example, as shown in FIG. 6A, a mounting plate 610 may be mounted to wire duct 510A using a plurality of rivets 620. The mounting plate may include a plurality of hooks 630 which are configured to mate with the slots 242. FIG. 6B is a detailed view of a portion of the mounting plate 710. FIG. 7A is another example of a mounting plate 710 having a plurality of hooks 730. FIG. 7B is a detailed view of a portion of the mounting plate 710. Various wire ducts may be mounted to the mounting plate 710, for example using rivets (not shown).

Figure 9A:
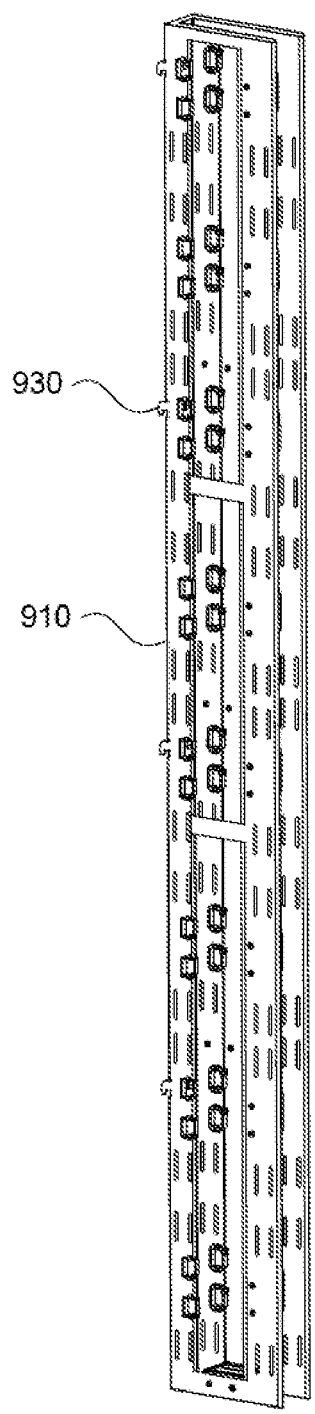
FIGS. 9A and 9B are example diagrams of a wire duct in accordance with aspects of the disclosure.
Figure 9B:
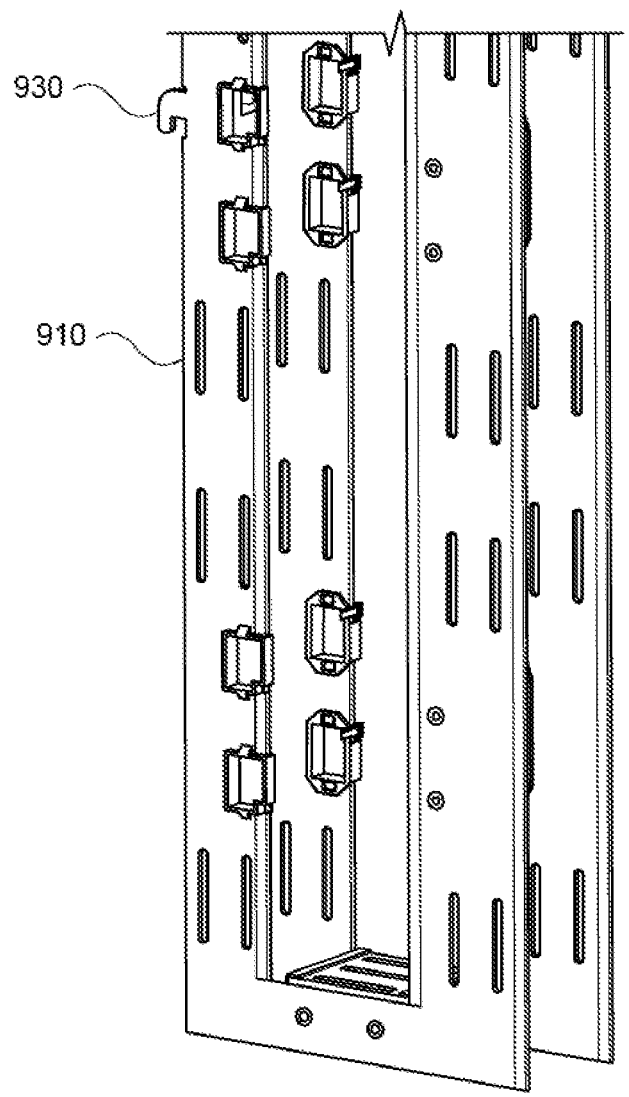
Figures 10A, 10B:
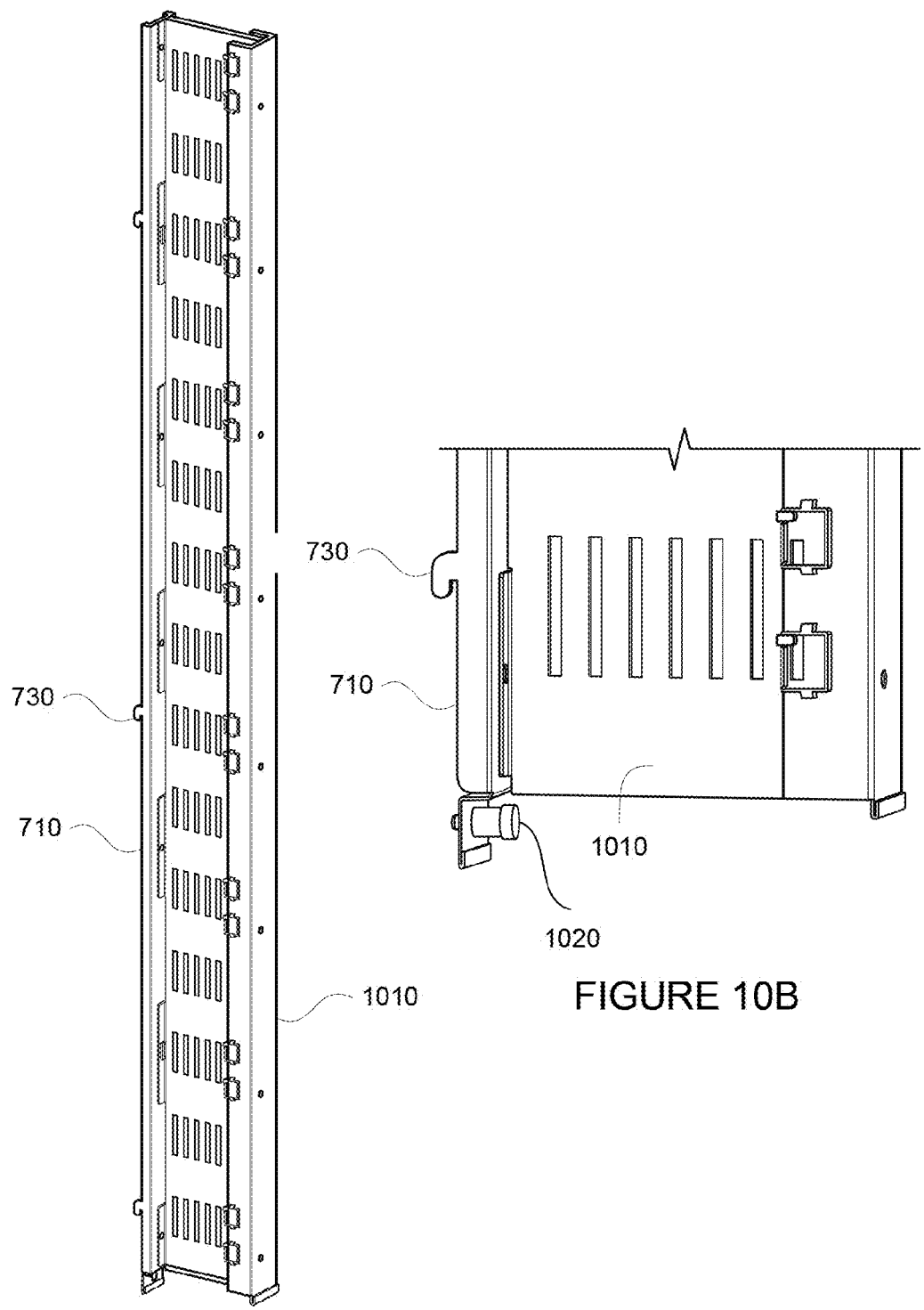
FIGS. 10A and 10B are example diagrams of a mounting plate and wire duct in accordance with aspects of the disclosure.

Various wire management structures configurations may be used. For example, FIGS. 8A and 8B, 9A and 9B, as well as 10A and 10B are examples of different types of wire ducts. FIG. 8A depicts an example of wire duct 510A (or 520 or 53) mounted to mounting plate 710. FIG. 8B is a detailed view of a portion of the wire duct 510A and mounting plate 710. FIG. 9A depicts an example of wire duct 510B. In this example, rather than being mounted to a mounting plate which includes hooks, hooks 930 of wire duct 510B are a part of the wire duct. FIG. 9B is a detailed view of a portion of the wire duct 510B. FIG. 10A depicts another example of a wire duct 1010 mounted to mounting plate 710. FIG. 10B is a detailed view of a portion of the wire duct 1010 and mounting plate 710.

Figure 11A:
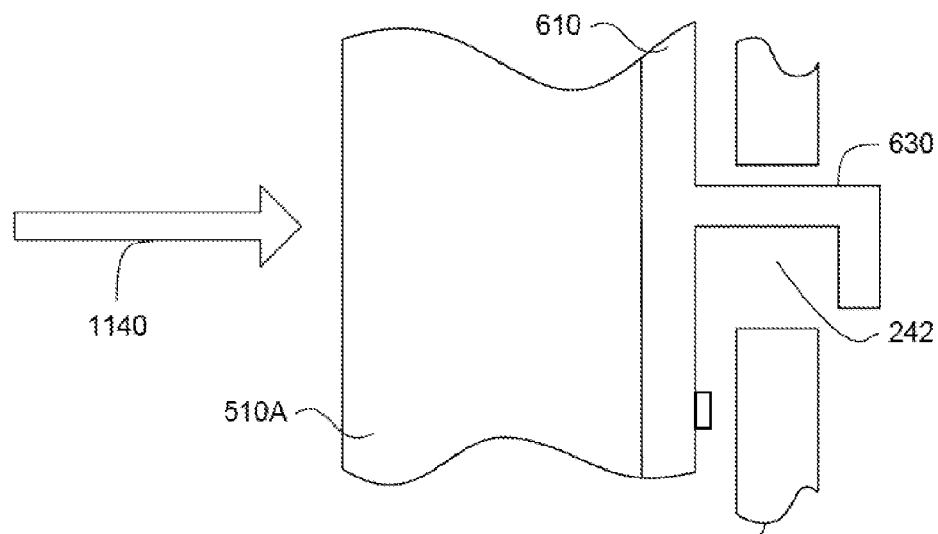
FIGS. 11A and 11B are example diagrams of side cross sectional views of a mounting plate, wire duct, and rack in accordance with aspects of the disclosure.
Figure 11B:
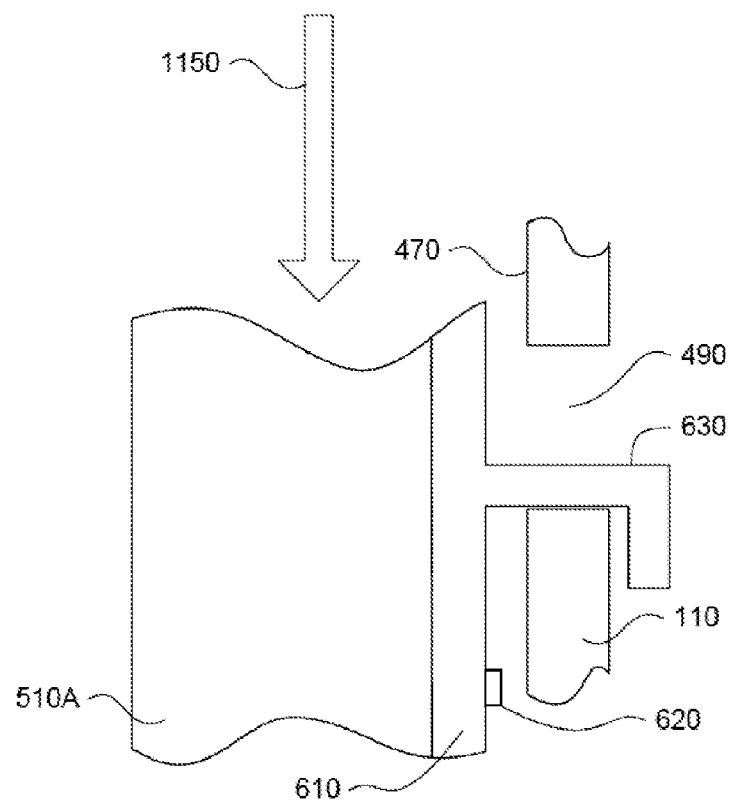

In order to install a mounting plate against the rack, the hooks of a mounting plate may be lined up and maneuvered through the slots 242 (or 542). For example, FIGS. 11A and 11B are side cross sectional views of a mounting plate 610 (or 710), wire duct 510A (510B, 520, 530, 910, or 1010) and the front end of rack 110 while a wire duct is being placed on the rack. Hook 630 of the mounting plate 610 may be placed through slot 242 in the direction of arrow 1140. The mounting plate and wire duct may then be then slid from the top end 120 of the rack towards the bottom end 122 of the rack in the direction of arrow 1150 until the hook is supported by the bottom portion of the slot as shown in FIG. 11B. Although only a single corresponding hook and slot are shown, each of the hooks of the mounting plate may be associated with a corresponding slot and placed in the rack in the same manner as shown in FIGS. 11A and 11B.

The hooks of the wire ducts and/or mounting plates and the slots of the rack 110 may allow the wire ducts and/or mounting plates to be secured to a rack and removed with relative ease. For example, no significant tools are required to remove or plate the wire duct. Rather, the wire duct of a rack may be replaced very quickly by sliding the insert up until the hooks are free from the slots and pulling the insert away from the rack. This allows for pre-configured wire ducts which may be removed and replaced with new pre-configured wire ducts in order to easily update the wiring without significant costs.

In some examples, additional features may be used to secure or lock the mounting plate and wire duct to the rack. For example, FIG. 5C depicts one example of a wire duct 520 about to be mounted to the rack 110. In this example, spring-loaded plunger assemblies, such as a PEM Type PTL2 spring-loaded plunger assembly, may be placed through the wire duct and secured to a hole, such as hole 550 shown in FIG. 5D (an enlarged view of a portion of FIG. 5C), in order to further secure the wire duct. FIG. 10B depicts an example of a spring plunger 1020 that may be used in conjunction with a hole, such as hole 550 of FIG. 5D. In another example, the mounting plate, such as mounting plate 710 of FIGS. 7A and 7B, may include tabs 740. These tabs may include screw holes 750 which line up with corresponding screw holes of the shelves such as screw holes 262 of shelf 200 shown in FIG. 2.

Figure 12:
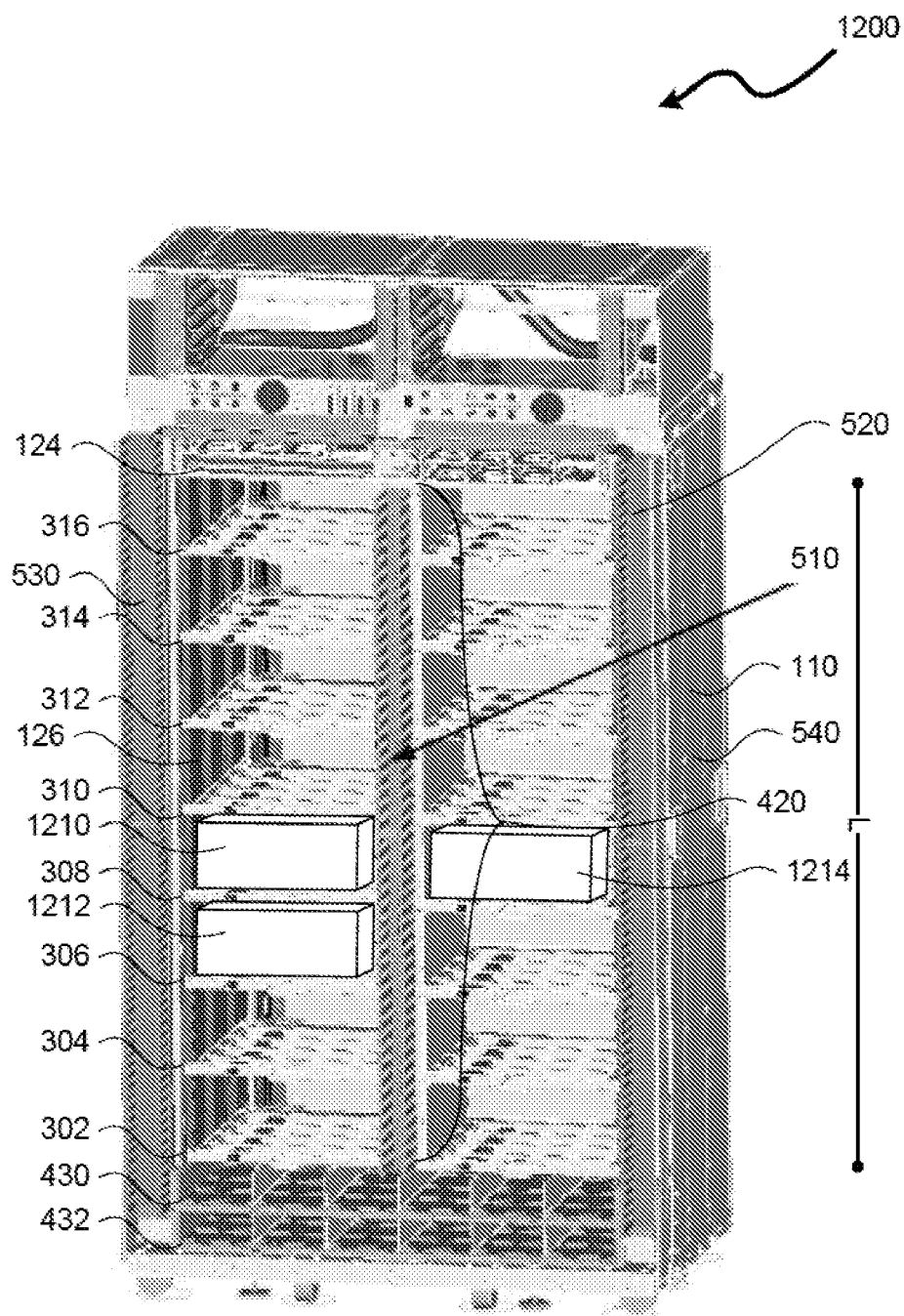
FIG. 12 is another example diagram of rack architecture in accordance with aspects of the disclosure.
Figure 13:
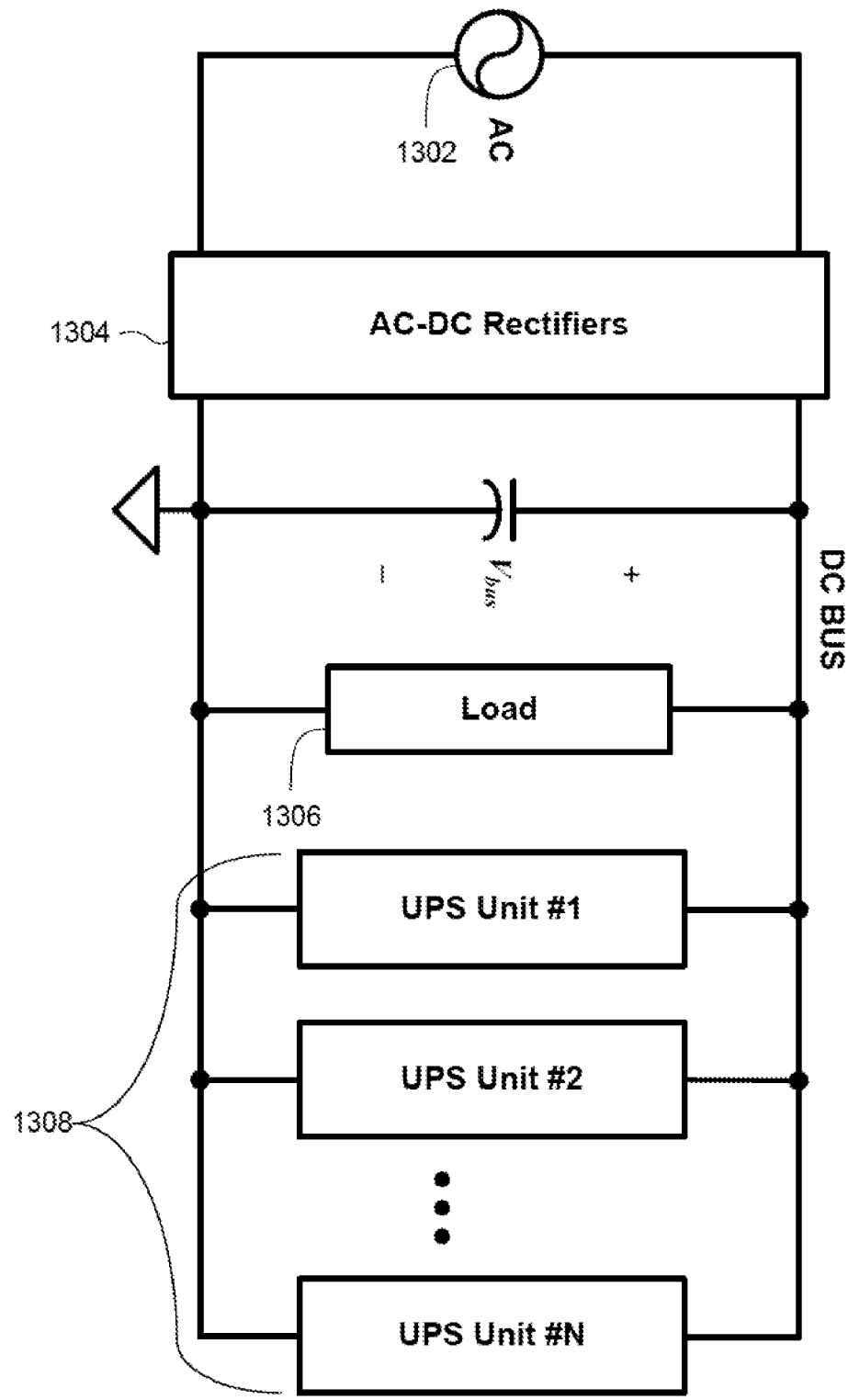
FIG. 13 is an example diagram of power architecture in accordance with aspects of the disclosure.

As shown in FIG. 12, rack 110 may include a plurality of computing components 1210, 1212, 1214 as part of a server system 1200. This combination of the rack and the computing components may be an aspect of the server system 1200 with power and data features. For example, rack 110 may supply power from a power source to the computing components.

Each of the shelves of the rack may be connected to a power supply, such as an AC or DC power source, by way of the main bus bar in order to provide power and data to the components or uninterrupted power supply units. FIG. 12 is an example of a power architecture for the server system 1000. An AC power source 1302 may be connected to rectifiers 1304 (housed on the additional shelves 118). In this example, the rectifiers 1304 may include 48 volt AC to DC rectifiers. The rectifiers may be connected to the main bus bar and supply power to a load 1306 (including components 1210, 1212, and 1214 of FIG. 12). The load 1306 may be connected in parallel to a plurality of uninterruptable power supply units 1108 (housed in the shelves 430, 432 of FIG. 4) which may be used as a backup power source.

Figure 14:
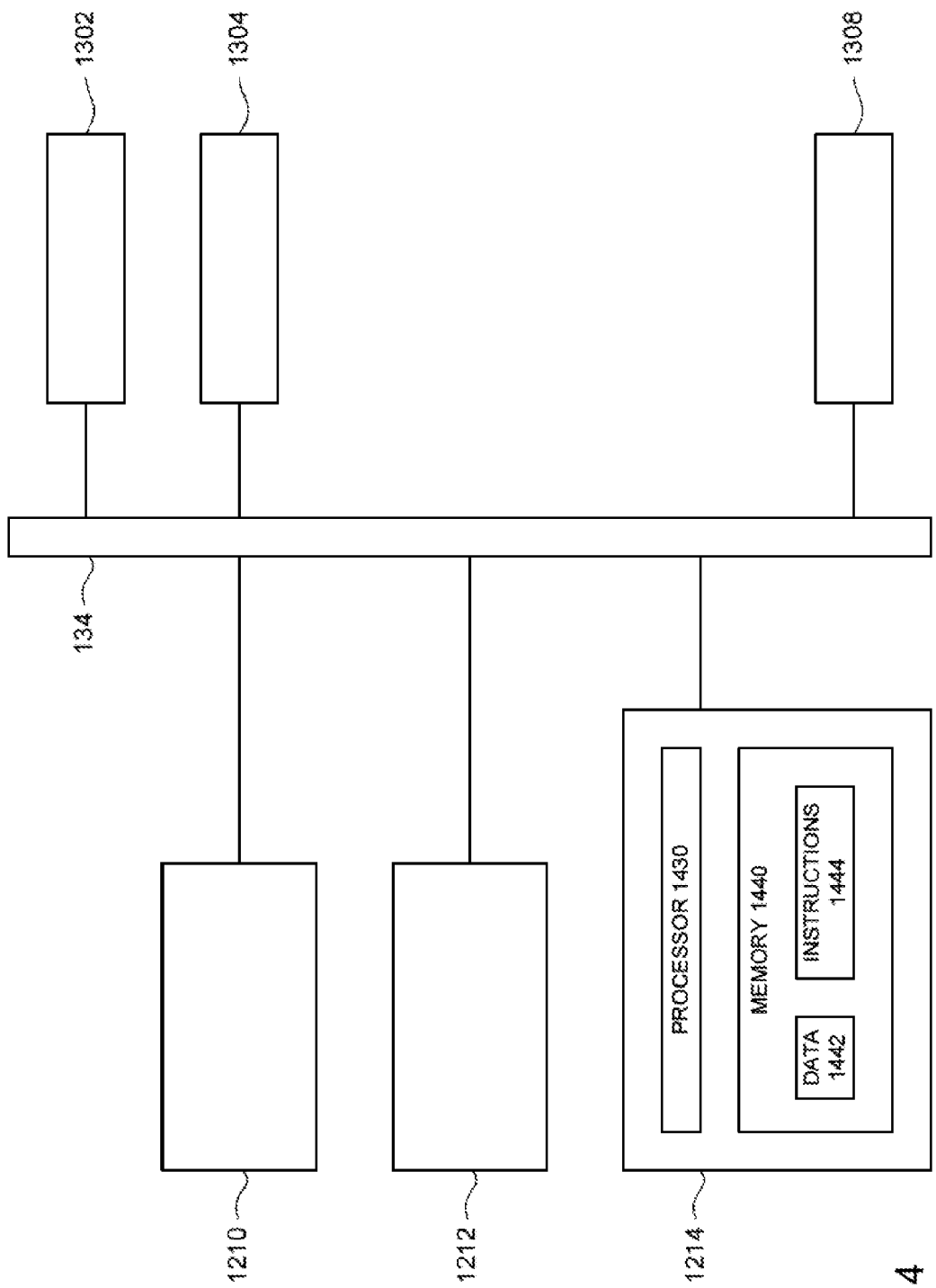
FIG. 14 is an example diagram of a rack configuration with including example components.

As described above, the load may include a plurality of components. Returning to FIG. 12, the shelves of rack 110 may receive components 1210, 1212, and 1214. In one example, component 1210 may be a dedicated storage device, for example, including any type of memory capable of storing information accessible by a processor, such as a hard-drive, memory card, ROM, RAM, DVD, CD-ROM, or solid state memory. In another example, component 1212 may be a preprogrammed load, which draws power from the main bus bar in order to test the operation of the server system 1200. In yet another example, shown in FIG. 14, component 1214 may be a computer including a processor 1430, memory 1440 storing data 1442 and instructions 1444, and other components typically present in general purpose computers. In a further example, component 1210 or 1212 may include a computer configured similarly to computer 1214, having a processor, memory, and instructions, or may be a dedicated memory. In this regard, rack 110 and components 1210, 1212, and 1214 may actually comprise part or all of a load balanced server array.

Figure 15:
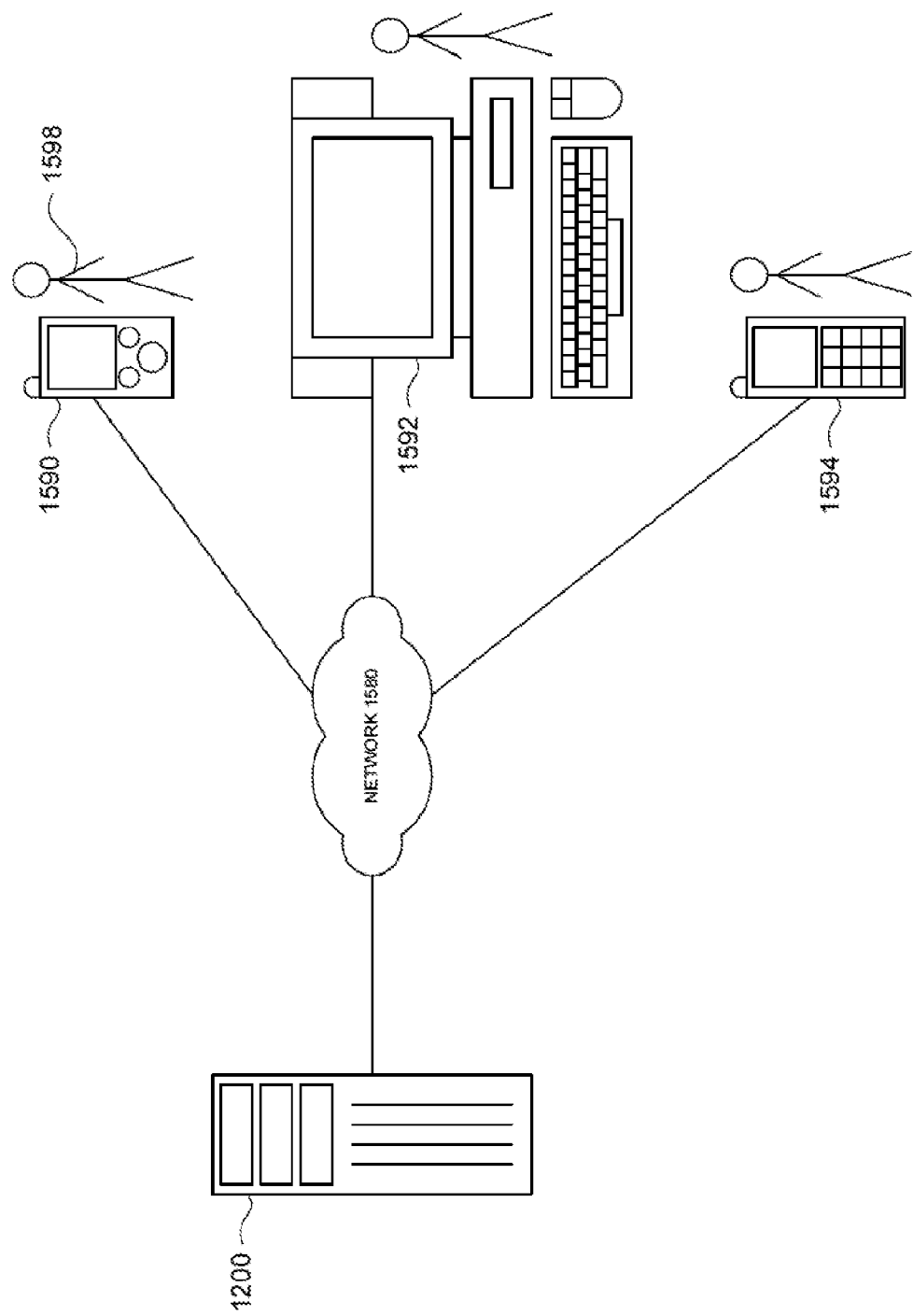
FIG. 15 is an example pictorial diagram of a networked system including a server.

As shown in FIG. 15, the server system 1200 may be at one node of a network 1580 and capable of directly and indirectly communicating with other nodes of the network. For example, these computers may exchange information with different nodes of a network for the purpose of receiving, processing and transmitting data to one or more client devices 1590, 1592, and 1594 via network 1580. In this regard, server system 1200 may transmit information for display to user 1598 on display of client device 1590. In this instance, the client devices will typically still be at different nodes of the network than any of the computers, memories, and other devices comprising the server system 1200.

The configurations described above may allow an administrator of the rack to change the configuration of the rack and add features quickly, easily, and with limited expense. For example, the column feature of the shelves may also allow for additional space to mount various features, such as the wire ducts described herein. For example, as described above, the wiring of the rack may be dramatically changed by simply switching out the wire duct and replacing it with one having a different quantities and/or types of wires.

As these and other variations and combinations of the features discussed above can be utilized without departing from the subject matter defined by the claims, the foregoing description of the implementations should be taken by way of illustration rather than by way of limitation of the subject matter defined by the claims. It will also be understood that the provision of the examples disclosed herein (as well as clauses phrased as "such as," "including" and the like) should not be interpreted as limiting the claimed subject matter to the specific examples; rather, the examples are intended to illustrate only one of many possible implementations. Further, the same reference numbers in different drawings may identify the same or similar elements.

The invention claimed is:

1. A rack assembly for housing one or more computing components, the rack assembly comprising:
   a rack including a first side wall having an interior facing wall and a second side wall having an interior facing wall opposing the interior facing wall of the first side wall, wherein the interior facing walls of the first and second side walls are configured to receive a plurality of shelves;
   a set of removable shelves configured to rest between the interior facing wall of the first sidewall and the interior facing wall of the second sidewall, the set of removable shelves comprising:
      a first shelf at a first position in the rack between the interior facing wall of the first sidewall and the interior facing wall of the second sidewall, the first shelf having a first column with at least two sides;
      a second shelf at a second position in the rack between the interior facing wall of the first side wall and the interior facing wall of the second sidewall and above the first position, the second shelf having a second column with at least two sides;
   wherein the at least two sides of the first column and the at least two sides of the second column form a larger column within the rack, the larger column including a plurality of slots disposed on a front surface of the first column and a front surface of the second column, the larger column being configured for mounting a device along a surface of the larger column, and
   wherein the rack further comprises a mounting plate having a plurality of hooks configured to mate with the plurality of slots in order to mount the mounting plate to the larger column, the mounting plate further including a set of tabs configured to align with a front surface of the first shelf adjacent to the first column in order to secure the mounting plate to the first shelf.

2. The rack assembly of claim 1, wherein the first column and the second column are separated by a gap, the larger column including the heights of the first column and the second column.

3. The rack assembly of claim 1, wherein the first column includes top and bottom openings, the second column includes top and bottom openings, and the larger column includes a hollow space that spans from the top opening of the second column to the bottom opening of the first column.

4. The rack assembly of claim 1, wherein the device is a wire duct for cable management.

5. The rack assembly of claim 1, wherein the first shelf comprises a first bay and a second bay for receiving computing components, and the first column separates the first bay from the second bay.

6. The rack assembly of claim 5, wherein the first bay is configured to house at least one of the computing components.

7. The rack assembly of claim 1, wherein the surface of the larger column comprises a first side of the at least two sides of the first column and a second side of the at least two sides of the second column and the larger column is configured for mounting the device along both the first side and the second side.

8. The rack assembly of claim 1, further comprising a wire duct, wherein the mounting plate is attached to a wire duct by a plurality of rivets.

9. The rack assembly of claim 8, wherein the wire duct is secured to the larger column with a plurality of spring plungers.

10. A rack assembly for housing one or more computing components, the rack assembly comprising:
    a rack includes a first side wall and a second side wall wherein the first side wall has a shelf mounting surface that faces a shelf mounting surface of the second side wall, and at least one of the first and second side walls includes a plurality of slots;
    a set of removable shelves configured to rest on a shelf support surface between the shelf mounting surface of the first side wall and the shelf mounting surface of the second sidewall, the set of removable shelves configured to support the one or more computing components; and
    a wire duct secured to the rack with a spring plunger; and
    a mounting plate attached to a wire duct by a plurality of rivets, the mounting plate comprising
    a plurality of hooks configured to mate with the plurality of slots in order to mount the mounting plate to the at least one of the first and second side walls; and
    a set of tabs configured to align with a front surface of a first shelf of the set of shelves in order to secure the mounting plate to the first shelf and further support the one or more computing devices.

11. A rack assembly for housing one or more computing components, the rack assembly comprising:
    a rack includes a first side wall and a second side wall wherein the first side wall has a shelf mounting surface that faces a shelf mounting surface of the second side wall, and at least one of the first and second side walls includes a plurality of slots;
    a set of removable shelves configured to rest on flanges between the shelf mounting surface of the first side wall and the shelf mounting surface of the second sidewall, the set of removable shelves configured to support the one or more computing components, and at least one of the set of removable shelves including a column having first and second sides;
    a wire duct secured to the rack with a spring plunger; and
    a mounting plate attached to the wire duct by a plurality of rivets, the mounting plate comprising
    a plurality of hooks configured to mate with the plurality of slots in order to mount the mounting plate to the at least one of the first and second side walls; and
    a set of tabs configured to align with a front surface of a first shelf of the set of shelves in order to secure the mounting plate to the first shelf and further support the one or more computing devices.

* * * * *